(12) United States Patent
Tremblay

(10) Patent No.: US 12,719,778 B2
(45) Date of Patent: Aug. 25, 2026

(54) ACTIVE NETWORK PERFORMANCE MEASUREMENT LEVERAGING NETWORKING PROTOCOL FEATURES

(71) Applicant: Cisco Technology, Inc., San Jose, CA (US)

(72) Inventor: Bernard Tremblay, Lorraine (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 7 days.

(21) Appl. No.: 18/798,286

(22) Filed: Aug. 8, 2024

(65) Prior Publication Data

US 2026/0046232 A1 Feb. 12, 2026

(51) Int. Cl.
*H04L 43/106* (2022.01)
*H04L 43/0864* (2022.01)
*H04L 69/16* (2022.01)
*H04L 69/163* (2022.01)

(52) U.S. Cl.
CPC .......... *H04L 43/106* (2013.01); *H04L 69/161* (2013.01); *H04L 69/163* (2013.01)

(58) Field of Classification Search
CPC ... H04L 43/106; H04L 69/161; H04L 69/163; H04L 43/0864
See application file for complete search history.

(56) References Cited

U.S. PATENT DOCUMENTS 6,587,438 B1 * 7/2003 Brendel ................ H04L 69/163 370/254
10,091,081 B2 10/2018 Robitaille et al.
10,110,448 B2 10/2018 Wallman
10,742,555 B1 * 8/2020 Shalev .................. H04L 47/283
11,146,485 B1 * 10/2021 Stein ..................... H04L 45/302
11,502,961 B2 11/2022 Robitaille
2015/0359016 A1 12/2015 Barany et al.
2017/0187598 A1 6/2017 Andreyev et al.
(Continued)

FOREIGN PATENT DOCUMENTS

WO 2023088634 A1 5/2023

OTHER PUBLICATIONS

Eddy W., "RFC 9293 Transmission Control Protocol (TCP)", Internet Engineering Task Force (IETF), Aug. 2022, https://www.ietf.org/rfc/rfc9293.html on Jul. 25, 2024, pp. 1-80.

*Primary Examiner* — Kamal M Hossain
(74) *Attorney, Agent, or Firm* — Edell, Shapiro & Finnan, LLC

(57) ABSTRACT

A method to obtain network performance measurements without having to deploy a reflector device in a network. The method involves generating at a first device, a first frame according to a feature of a networking protocol, wherein the first frame is generated by inserting timestamp information indicating a departure time of the first frame into each of a first field and a second field of a header of the first frame. The first device sends the first frame to a network entity in a network. The first frame is configured to cause the network entity to send, in reply to the first frame, a second frame according to the feature of the networking protocol. The second frame includes timestamp information in either a first field or a second field of a header of the second frame. The first device receives the second frame and derives a network performance metric.

20 Claims, 6 Drawing Sheets

(56) References Cited

U.S. PATENT DOCUMENTS

| | | | | |
|---|---|---|---|---|
| 2018/0097738 | A1* | 4/2018 | Torres | H04L 47/40 |
| 2019/0306043 | A1 | 10/2019 | Hansson et al. | |
| 2020/0084130 | A1 | 3/2020 | Mokkapati et al. | |
| 2022/0086261 | A1 | 3/2022 | Tian et al. | |
| 2023/0208734 | A1* | 6/2023 | Bothe | H04L 43/087<br>709/224 |

* cited by examiner

ACTIVE NETWORK PERFORMANCE MEASUREMENT LEVERAGING NETWORKING PROTOCOL FEATURES

TECHNICAL FIELD

The present disclosure relates to measuring network performance.

BACKGROUND

Active performance measurement techniques may use a sender-reflector architecture to capture performance measurements related to operations of a network. While sender devices can be easily deployed, deploying reflectors often involves changes in network configuration or a new service/device installation. For example, when a user is evaluating a new type of network handling many services, time and resources are involved in installing a reflector everywhere in the network the user wants to obtain a performance measurement. This can be costly and in some cases, not possible.

DETAILED DESCRIPTION

Overview

According to one embodiment, a method is provided to obtain network performance measurements in a network without having to deploy a reflector device in the network. The method involves generating at a first device, a first frame according to a feature of a networking protocol. Generating the first frame includes inserting timestamp information indicating a departure time of the first frame into each of a first field and a second field of a header of the first frame. The first device sends the first frame to a network entity in a network. The first frame is configured to cause the network entity to send, in reply to the first frame, a second frame according to the feature of the networking protocol. The second frame includes timestamp information indicating a departure time of the second frame in either a first field or a second field of a header of the second frame. The first device receives the second frame. The first device or another device or entity derives a network performance metric from the timestamp information indicating a departure time of the first frame and the timestamp information included in the second frame. In one example, the networking protocol that is leveraged is the Transmission Control Protocol (TCP) and the feature of TCP that is used is the TCP Half-Close feature.

Example Embodiments

Figure 1:
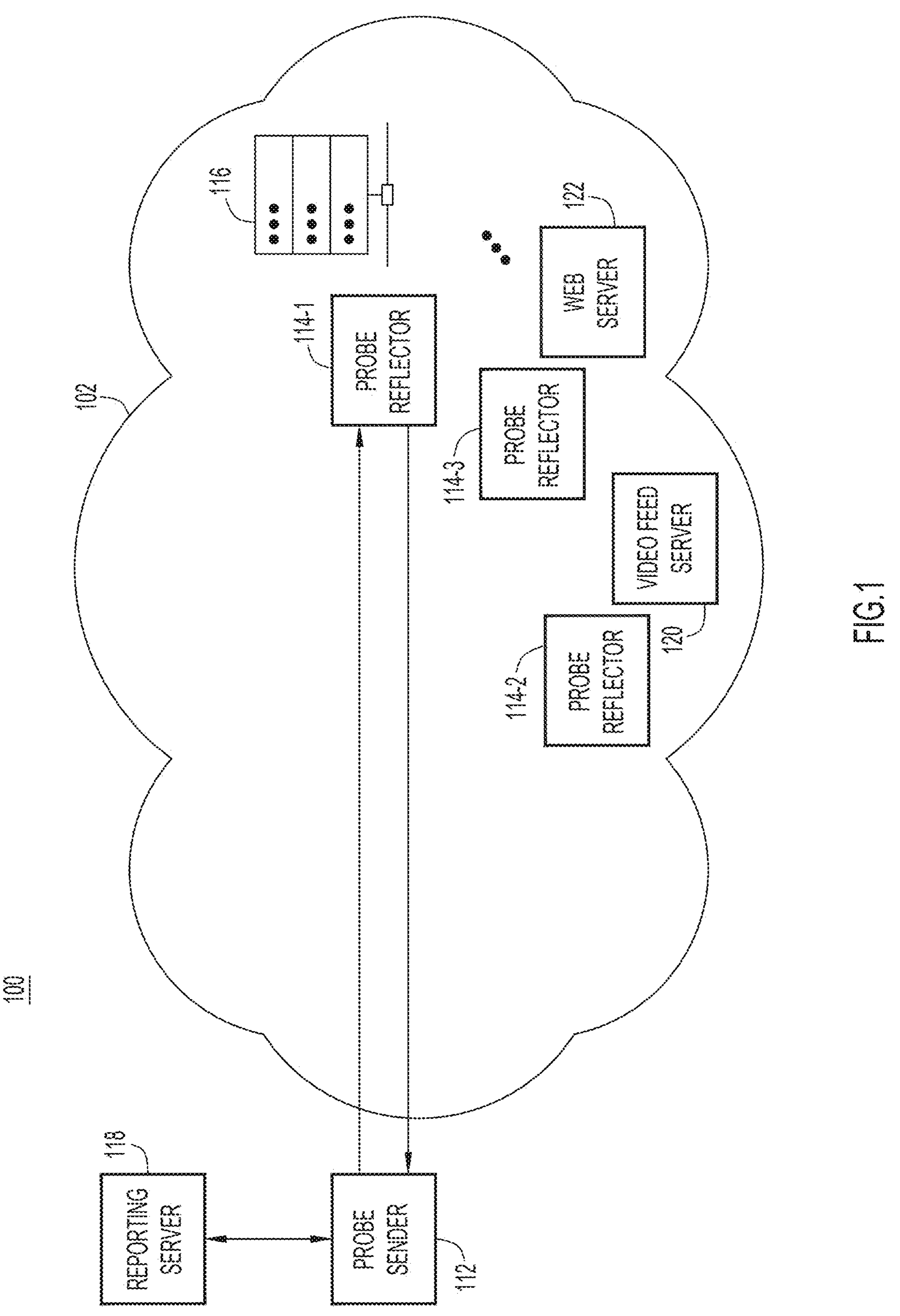
FIG. 1 is a diagram depicting a conventional network probing architecture that relies on probe reflectors installed at various locations in a network.

FIG. 1 illustrates a traditional sender-reflector framework 100 in which n reflectors are deployed into the network. A probe sender 112 sends into a network 102 a probe packet to a dedicated probe reflector 114-1 that is deployed in the network 102. The probe sender 112 receives probe response packets reflected back by the probe reflector 114-1 and then sends performance-related measurements to reporting server 118. Alternatively, the probe sender 112 may send the raw measurement data to the reporting server 118, and the reporting server 118 makes the appropriate performance measurement calculations. The reporting server 118 may be any suitable server that is in communication with the probe sender 112, and which is configured to analyze raw measurement data and/or present the performance measurement data for a user to evaluate or analyze.

A probe reflector would need to be deployed in each area/location or associated with each network entity for which it is desired to make network performance measurements. The probe reflector could be a dedicated hardware device or dedicated software, configured and designed to be capable of cooperating with the probe sender 112 for making performance-related measurements. For example, probe reflector 114-1 is deployed in association with the router 116. To make measurements associated with other locations or entities in the network 102, additional probe reflectors would need to be deployed. For example, a probe reflector 114-2 would need to deployed for a video feed server 120, a probe reflector 114-3 would need to be deployed for the web server 122, and so on. This can be costly and complex depending on what access can be obtained into a certain area of a network.

Techniques are presented herein that use any available network entity that can listen to packets transmitted according to a networking protocol to enable network performance measurements to be made without having to deploy additional specific reflectors. Thus, capabilities of an existing/available network entity are used as a reflector. In one example, the techniques use the Transmission Control Protocol (TCP) as the networking protocol to enable the capture of network performance measurements. TCP is one of the several protocols of the Internet Protocol suite, and TCP operates between the application layer and network layer. TCP is a connection-oriented protocol for communications involving the exchange of messages between different devices/entities over a network. In particular, TCP has a feature that can be used to capture performance measurements, such as delay, jitter and packet loss.

This feature of TCP, called the TCP Half-Close, allows an entity to signal that it is finished sending data to the other side by sending to the other side a finish (FIN) packet, but the entity may still want to receive data from the other side until the other side sends a (FIN) packet. The techniques presented herein leverage the TCP Half-Close feature in a unique way to capture the aforementioned performance measures such as delay, jitter and packet loss. These measurements can provide meaningful information, such as server application performance and service availability. By leveraging capabilities of existing network entities that can respond to TCP probes in a unique way, a network administrator need not deploy dedicated reflectors into the network. This is particularly advantageous when the network administrator does not necessarily have physical access to the numerous locations in a network where it is desired to make performance measurements.

Figure 2:
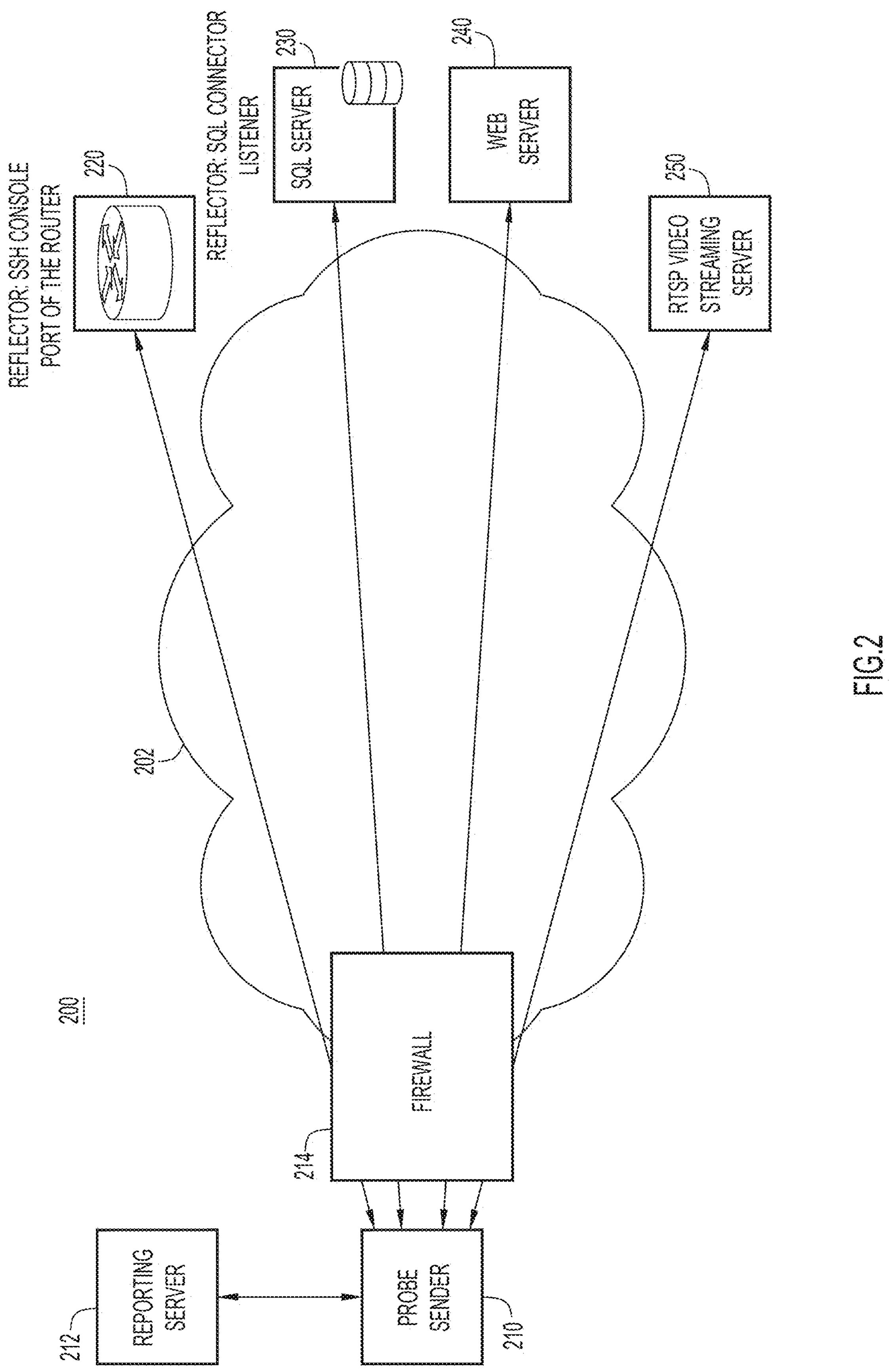
FIG. 2 is a diagram depicting a network probing architecture that uses capabilities of network entities already deployed in a network to serve as probe reflectors, according to an example embodiment.

Reference is now made to FIG. 2. FIG. 2 is illustrates a system 200 according to an example embodiment. The system 200 leverages capabilities of existing network entities (hardware or software) in a network 202 that can listen and respond to certain packets, and in so doing, act as reflectors. The system 200 includes a probe sender 210 that is capable of sending probe packets into the network 202. There may be a firewall 214 between the probe sender 210 and the network 202. The probe sender 210 is in communication with a reporting server 212. The probe sender 210 may be any network-connected device having sufficient computing capabilities to generate certain frames/packets according to a networking protocol, insert timestamp information indicating time of departure of sent frames/packets, store the timestamp information, receive frames/packets and extract timestamp information from the frames, store time of arrival information of received frames/packets, and perform computations based on the timestamp information obtained from received frames/packets and stored timestamp information.

There are various entities in or attached to the network 202 that include network communication capabilities that can be leveraged to serve as probe reflectors. As an example, FIG. 1 shows a router 220, a SQL server 230, a web server 240 and a Real-Time Streaming Protocol (RTSP) video streaming server 250. These are only examples of entities commonly found in a network that can be leveraged to serve as reflectors. The router 220 has a Secure Shell (SSH) Console port that supports TCP and can be leveraged to enable the router 220 to act as a reflector. The SQL server 230 has a SQL Connector listener function that supports TCP and can be leveraged to enable the SQL server 230 to act as a reflector. Similarly, the web server 240 and RTSP video streaming server 250 each typically supports TCP. The entities shown in FIG. 2 are examples of network entities that support a protocol like TCP that can be leveraged to perform delay and packet loss measurements, according to the techniques presented herein. Any other type of TCP server/service can be used with the techniques presented herein.

Figure 3:
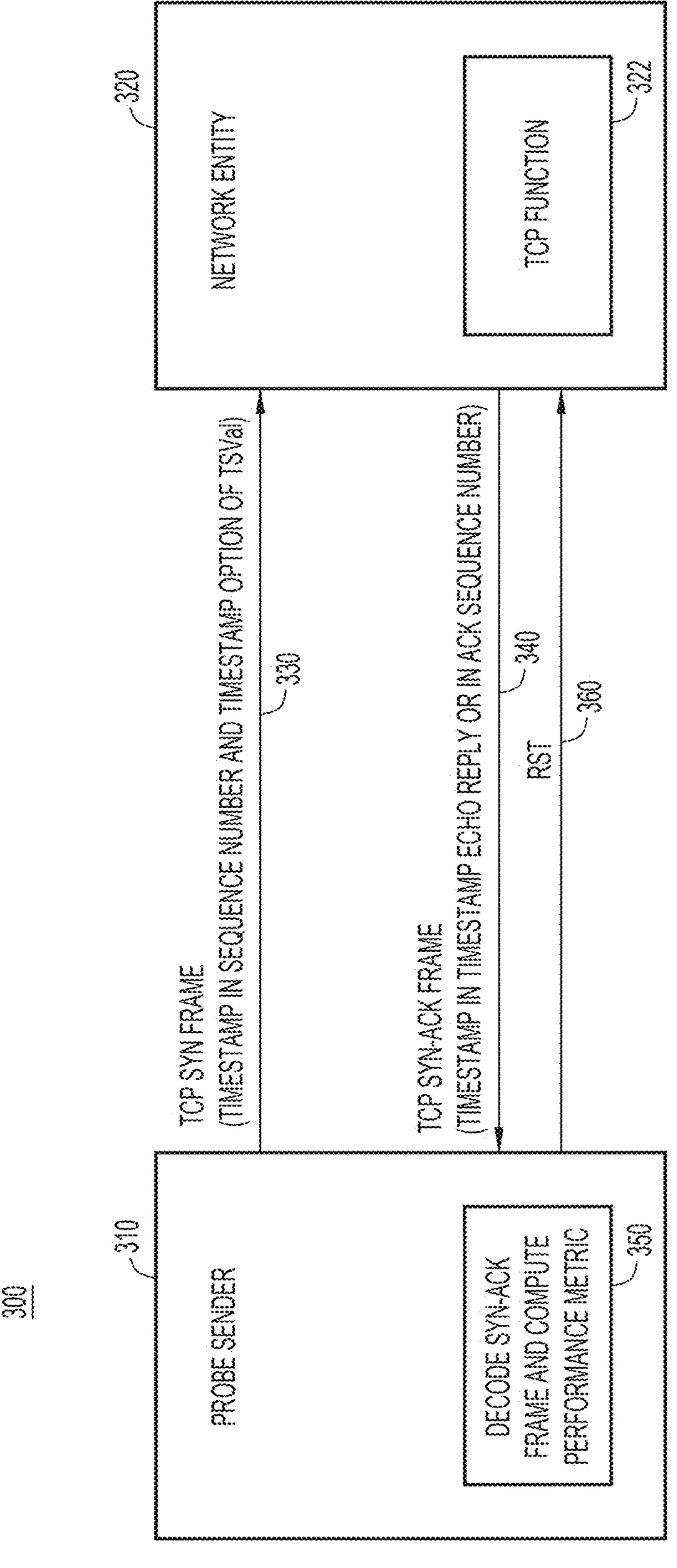
FIG. 3 is a sequence diagram depicting a process to leverage a feature of a networking protocol to cause a network entity to serve as a probe reflector in a network, according to an example embodiment.

Reference is now made to FIG. 3. FIG. 3 shows a sequence diagram for a process 300 by which a probe sender 310 triggers a network entity 320 that has a TCP function 322 to respond in such a way that information can be derived from the response that reflects a network performance measurement with respect to that network entity. The network entity 320 may be any of the network entities shown in FIG. 2. The process 300 leverages the TCP Half-Close feature of TCP to send a TCP synchronize (SYN) frame/packet with a timestamp value inserted therein to a specific port (of network entity 320), which will cause the network entity 320 to generate and send a synchronize-acknowledgment (SYN-ACK) frame/packet with timestamp information inserted there. Thus, the process 300 allows for obtaining various network performance measurements, such as a round trip time (RTT) measurement, packet loss, latency, from any TCP service that is configured to listen to a particular port (on a network entity). By adding the time of departure inside the frame/packet, there is no need for any logic to track when this frame was actually sent. By adding this signature inside the frame, the analysis is performed only on the received/reflected frame, because the departure time is embedded in the reflected frame, reducing the logic and processing complexity. This is an efficient way to pair transmit time with receive time.

The process 300 generally operates as follows. The probe sender 310 includes timestamp information in a TCP SYN frame (indicating the departure time of the SYN frame) that the probe sender 310 sends to (a port of) the network entity 320. The timestamp information is included in two places in the SYN frame: (1) in the sequence number field of the TCP header and (2) in the Timestamp (TS) option field (called TSval) of the header of the SYN frame. Measurement precision can be higher when the TCP Timestamp option field is used, but sometimes due to Common Vulnerabilities and Exposures (CVE), the network entity may disable the TCP TS option from the TCP stack, and therefore a backup arrangement is provided, e.g., using the sequence number field.

The probe sender 310 automatically detects what timestamp insertion capability is enabled by the TCP function 322 of the network entity 320 based on the content of the SYN-ACK frame that the network entity 320 sends back to the probe sender. The probe sender 310 analyzes the timestamp information in the SYN-ACK frame that the network entity 320 responds back with, to calculate a network performance measurement for the path between the probe sender 310 and the network entity 320. The probe sender 310 also detects packet loss, if any, based on the sequence number of the SYN frame and SYN-ACK frame.

More specifically, as shown in FIG. 3, the probe sender 310 sends a TCP SYN frame 330. The probe sender 310 includes in the SYN frame 330 a departure timestamp ("hidden") in two places in the header of the SYN frame:

TCP sequence number (tcphdr.seq)

Timestamp option TSVal (tcpheaderOptions.tcph_time)

In one example, the gettimeofday function is called from a Linux kernel running on the probe sender 310 to obtain a departure timestamp value for the TCP SYN frame 330. The gettimeofday function returns 32 bits for seconds and another 32 bits for nanoseconds. The nanoseconds may be encoded using the 24 most valuable bits, leaving 8 bits for seconds. The 32 bits representing the departure timestamp are inserted in the TSval subfield of the timestamp options field and in the sequence number field of the header of the SYN frame 330.

An example of the pseudocode for generating the SYN packet (with the timestamp information included in both locations) is presented below:

```
struct acd_timeval_tv;
get_timestampraw (&_tv);
u_int32_t time=(_tv.tv_sec<<24);
printf("TX %d sec %d usec\n", time>>24,
  ((_tv.tv_usec>>8) & 0x00FFFFFF)<<8);
time |=((_tv.tv_usec>>8) & 0x00FFFFFF);
printf ("TX shifted 0x%08x sec-usec 16bits\n",time);
sc->tcp_head->seq=htonl(time); //encapsulate time in
  sequence number in case of TS option not enabled on
  remote end
sc->tcp_opts->tcph_time=htonl(time); //encapsulate time
  in TS option (TSval)
```

When the network entity 320 running the TCP function 322 receives the TCP SYN frame 330, the network entity 320 will generate an acknowledgment frame, called a SYN-ACK frame 340. If the network entity 320 is enabled to use the timestamp options field, then the TCP function 322 will insert the departure timestamp (indicating the time when the SYN-ACK frame 340 departs the network entity 320) in the timestamp echo reply (TSecr) subfield of the timestamp options field. On the other hand, if the network entity 320 is not enabled to use the timestamp options field, then the TCP function 322 inserts the departure timestamp in the acknowledgment (ACK) sequence number field.

At 350, the probe sender 310 receives the SYN-ACK frame 340 and decodes it to ultimately compute a network performance metric for the connection between the probe sender 310 and the network entity 320. The probe sender 310 decodes the SYN-ACK frame 340 by first determining whether the TSecr (tcpheaderOptions.tcph_timeEcho) is present and contains the timestamp inserted by the network entity 320. When the probe sender 310 determines that the TSecr field is not present (does not contain timestamp information), then the probe sender extracts the timestamp information from the ACK sequence number field.

The probe sender 310 can obtain the departure timestamp inserted by the network entity 320 into the SYN-ACK frame and perform a subtraction from the arrival time of the SYN-ACK frame 340 to compute a one-way latency metric (from the network entity 320 to the probe sender 310). On the other hand, when timestamp information is carried in the sequence number field of the SYN frame 330 and in the ACK sequence number field of the SYN-ACK frame 340, an adjustment is made to account for the fact that the network entity 320 will increment the ACK sequence number by a value of 1 ("one"). Thus, in computing a network performance metric using timestamp information included in the ACK sequence number field, a subtraction of a value of 1 ("one') is made. Moreover, by design, the sequence number of the packet that the probe sender sends is always sent back in the acknowledgment sequence number field as well as the TSecr field of the SYN-ACK frame. Those two fields are copied from the packet that the probe sender sends. Then by transporting those numbers, the probe sender can derive the RTT upon reception of those frames.

Moreover, the probe sender 310 can evaluate the value of the ACK sequence number field of the SYN-ACK frame 340 against the sequence number included in the SYN frame 330 to determine whether there is an offset between those sequence numbers of more than 1 ("one"). If there is an offset of more than one, this indicates that a previously sent SYN-ACK frame (with the properly incremented sequence number) has been lost, which is a useful network performance metric.

An example of pseudocode that the probe sender 310 may use to decode the SYN-ACK frame 340 is presented below:

```
//Get time of arrival
struct acd_timeval _tv;
get_timestampraw(&_tv);
//Decoding when Timestamp option is available inside reflected frame
if(tcp_opts->tcph_timeOpt == 8 && tcp_opts->tcph_timeLen == 10) //
TS Option is available...
{
  u_int32_t rx_sec = (_tv.tv_sec & 0x000000FF);
  u_int32_t rx_usec = _tv.tv_usec;
  u_int32_t tx = ntohl(tcp_opts->tcph_timeEcho);
  u_int32_t tx_sec = (tx>>24);
  u_int32_t tx_usec = (tx<<8);
}
```

-continued

```
//Decoding when Timestamp option is not available, fall back to sequence
number inside reflected frame
else
{
  u_int32_t rx_sec = (_tv.tv_sec & 0x000000FF);
  u_int32_t rx_usec = _tv.tv_usec;
  u_int32_t tx = ntohl(tcp_head->ack_seq)-1; //Network entity thinks it is
a sequence number so it incremented it by 1
  u_int32_t tx_sec = (tx>>24);
  u_int32_t tx_usec = (tx<<8);
}
```

To calculate the round trip time (RTT), the probe sender extracts information from the SYN_ACK frame as indicate in the pseudocode above:

1. Get Time of Arrival of SYN_ACK frame (rx_sec and rx_usec), where usec refers to microseconds (usec).
2. Select the departure time from TSOption or Acknowledgment Sequence Number and decode it (tx_sec and tx_usec).
3. Compute delay RTT: RTT=rx_usec-tx_usec.
4. Jitter=$|RTT_{frame1}-RTT_{frame2}|$. For example, if $RTT_{frame1}$ is 15 milliseconds (ms) and $RTT_{frame2}$ is 23 ms. Jitter=|frame1−frame2|, so Jitter=|15−23|=8 ms.

At 360, the probe sender 310 sends an RST frame sent to the network entity 320 to inform the network entity 320 to end the TCP connection. This completes the TCP Half-Close procedure. The RST frame includes a flag to indicate closure of the session between the probe sender 310 and the network entity.

By using the state machine of TCP to create a connection, the SYN (synchronize) frame serves as a performance measurement probe frame/packet and the SYN-ACK (synchronize-acknowledgment) frame serves as a reflection frame/packet.

Figure 4:
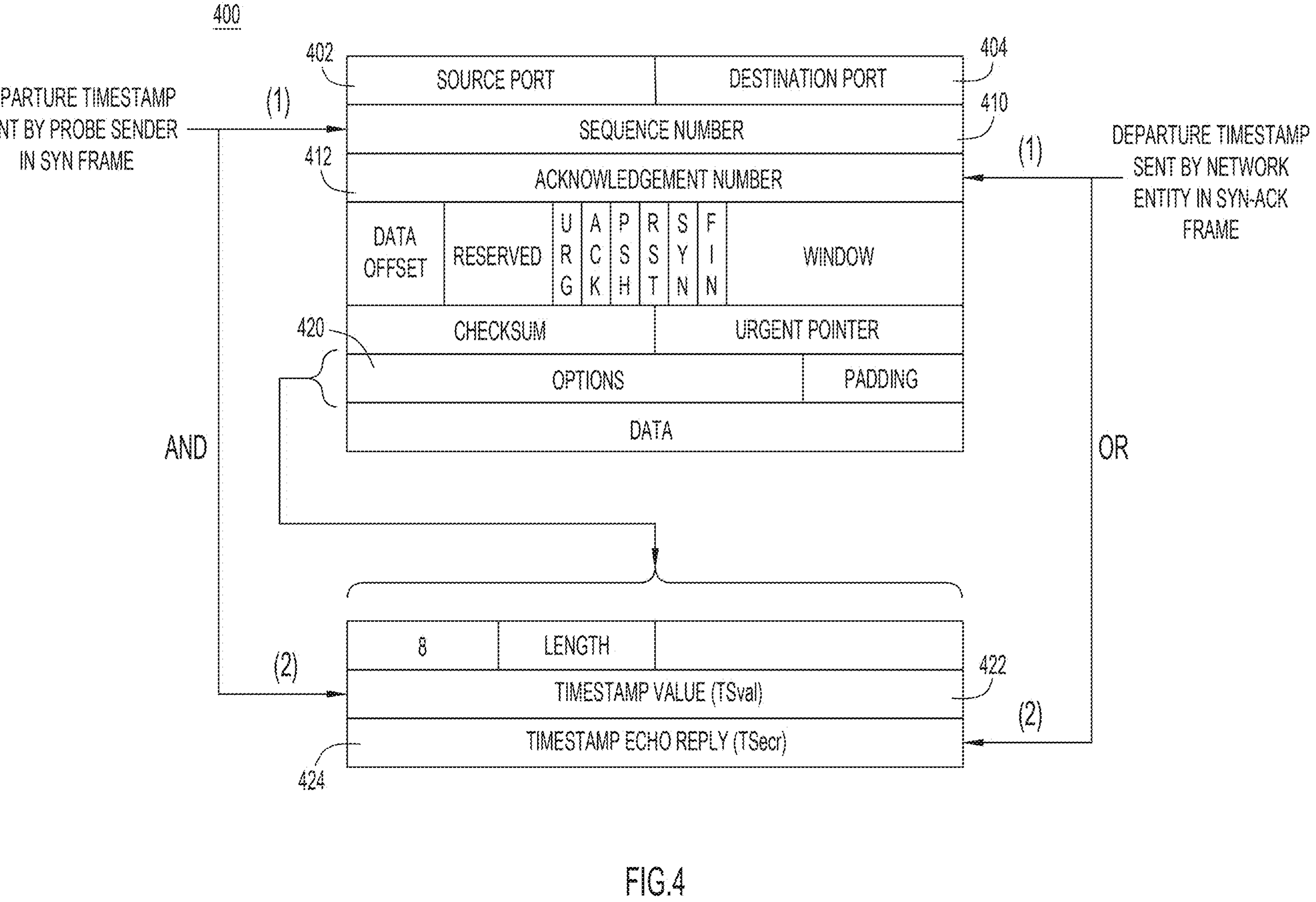
FIG. 4 is a diagram depicting how timestamp information may be inserted into multiple fields of a header of a Transmission Control Protocol (TCP) frame for purposes of the network performance measurement techniques presented herein, according to an example embodiment.

Reference is now made to FIG. 4. FIG. 4 illustrates an example of a TCP header 400 that may be used in SYN frame 330 and in SYN-ACK frame 340 to carry the timestamp information. Of relevance to the techniques presented herein, the TCP header 400 includes a source port field 402, a destination port field 404, a sequence number field 410, an acknowledgment sequence number field 412, and a TCP options field 420. The TCP options field includes a timestamp value (TSval) subfield 422 and a timestamp echo reply (TSecr) subfield 424.

As explained above in connection with FIG. 3, the probe sender 310 inserts departure timestamp information of the SYN frame 330 into both (1) the sequence number field 410 and (2) the timestamp value subfield 422 of the TCP options field 420, of the SYN frame 330. The network entity 320 inserts departure timestamp information of the SYN-ACK frame 340 into either (1) the acknowledgment sequence number field 412 or (2) the timestamp echo reply subfield 424 of the SYN-ACK frame 340 if the network entity 320 has the TCP options feature enabled on TCP function 322.

Figure 5:
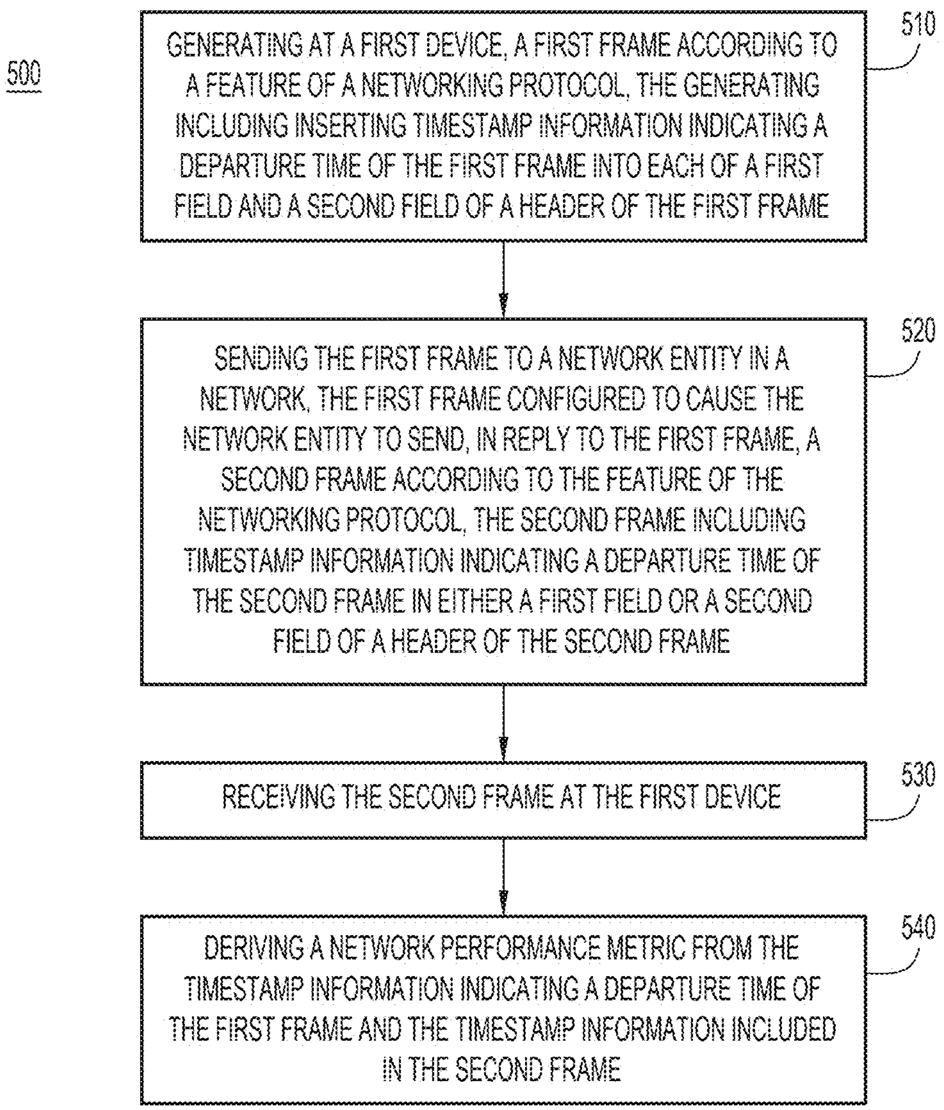
FIG. 5 is a flow chart depicting a method of deriving network performance measurements according to an example embodiment.

Turning now to FIG. 5, a flow chart is shown for a method 500 according to an example embodiment. The method 500 includes, at step 510, generating at a first device, a first frame according to a feature of a networking protocol. The generating includes inserting timestamp information indicating a departure time of the first frame into each of a first field and a second field of a header of the first frame. At step 520, the method 500 includes sending the first frame to a network entity in a network. The first frame is configured to cause the network entity to send, in reply to the first frame, a second frame according to the feature of the networking protocol, where the second frame includes timestamp information indicating a departure time of the second frame in either a first field or a second field of a header of the second frame. At step 530, the method 500 includes receiving the second frame at the first device. At step 540, the method 500 includes deriving a network performance metric from the timestamp information indicating a departure time of the first frame and the timestamp information included in the second frame.

Network performance measurement sometimes involves making changes of device installations in the network. The solution presented herein achieves network performance measurements over a network handling numerous services without having to install and configure reflectors at various locations of interest in a network. Thus, the techniques presented herein leverage capabilities of a networking protocol, such as TCP, to enable various network entities in a network to serve as a universal reflector. Different performance indicators can be derived, such as delay (latency), jitter and packet loss. Moreover, when analyzing such performance measurements over time, an extensive amount of otherwise hidden but useful information can be derived, such as server application performance and service availability. This information can be very useful in identifying and solving network/application problems. Moreover, the techniques presented herein enable marking if frames/packets with high precision timestamp information (with nanosecond precision) to indicate departure time of a frame/packet.

Figure 6:
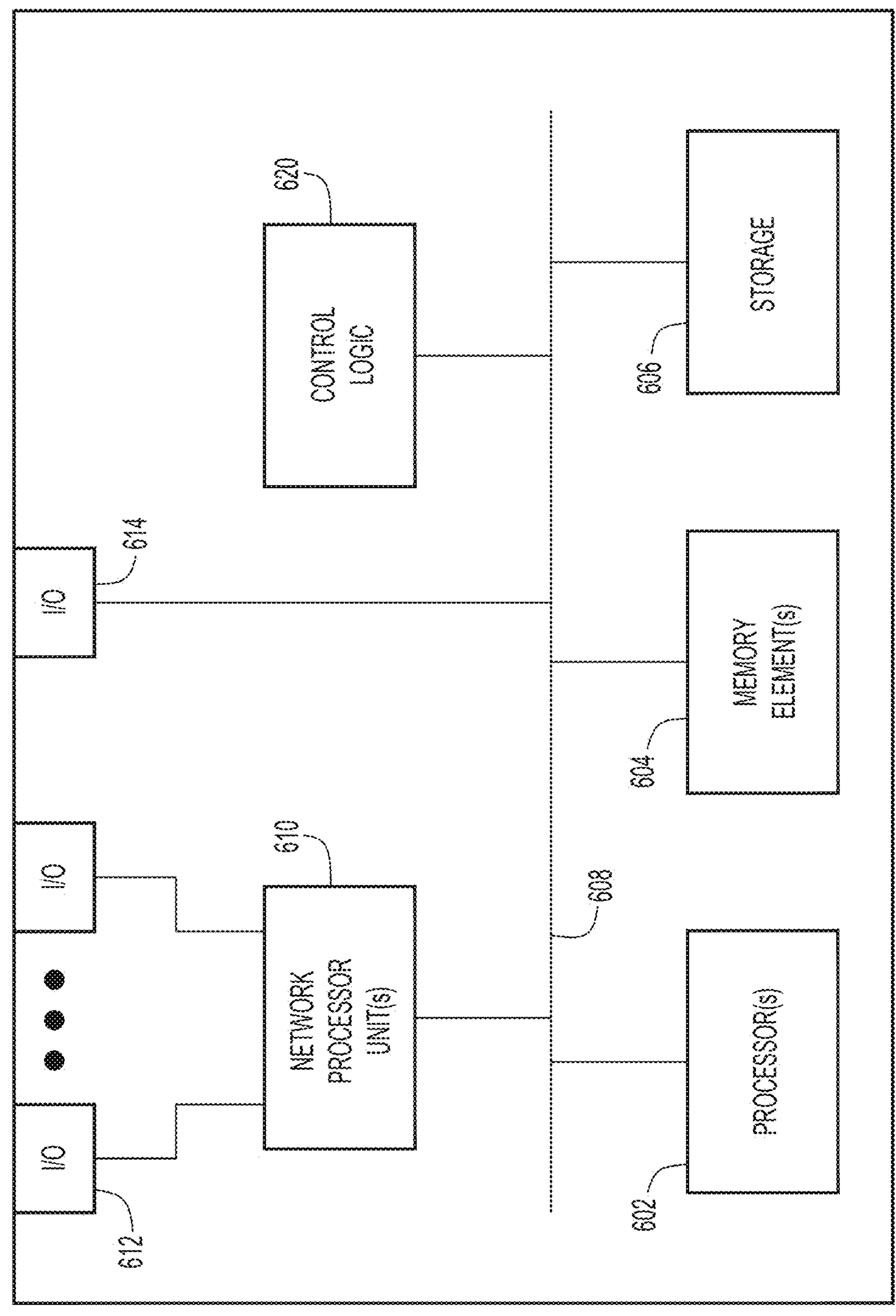
FIG. 6 is a block diagram of a computing device that may be configured to operate as a probe sender or probe reflector to perform the network performance measurement techniques presented herein, according to an example embodiment.

FIG. 6 illustrates a hardware block diagram of a computing device 600 that may perform functions associated with operations discussed herein in connection with the techniques depicted in FIGS. 2-5. In various embodiments, a computing device or apparatus, such as computing device 600 or any combination of computing devices 600, may be configured to operate as any entity/entities (such as the probe sender 210 and reporting server 212 shown in FIG. 2, as well as a probe sender 310 and network entity 320 shown in FIG. 3) as discussed for the techniques depicted in connection with FIGS. 2-5 in order to perform operations of the various techniques discussed herein.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method including: generating at a first device, a first frame according to a feature of a networking protocol, the generating including inserting timestamp information indicating a departure time of the first frame into each of a first field and a second field of a header of the first frame; sending the first frame to a network entity in a network, the first frame configured to cause the network entity to send, in reply to the first frame, a second frame according to the feature of the networking protocol, the second frame including timestamp information indicating a departure time of the second frame in either a first field or a second field of a header of the second frame; receiving the second frame at the first device; and deriving a network performance metric from the timestamp information indicating a departure time of the first frame and the timestamp information included in the second frame.

The method may further include sending a third frame from the first device to the network entity, the third frame including a flag to indicate a closure of a session between the first device and the network entity.

In one example, the networking protocol is the Transmission Control Protocol (TCP) and the feature of the networking protocol is the TCP Half-Close feature.

In one example, the first frame is a TCP synchronize (SYN) frame, the first field is a sequence number field of a header of the TCP SYN frame and the second field is a timestamp value subfield of a TCP options field of the header of the TCP SYN frame.

In one example, the second frame is a TCP synchronize-acknowledgment (SYN-ACK) frame, the first field is an acknowledgment sequence number field of a header of the TCP SYN-ACK frame and the second field is a timestamp echo reply subfield of a TCP options field of the header of the SYN-ACK frame.

In one example, the method further includes decoding the SYN-ACK frame received from the network entity to determine whether the timestamp information indicating the departure time of the second frame is included in the timestamp echo reply subfield, and if not, obtaining the timestamp information indicating the departure time of the second frame from the acknowledgment sequence number field of the header of the SYN-ACK frame.

In one example, deriving the network performance metric includes performing a subtraction of an arrival time of the SYN-ACK frame at the first device from the timestamp information indicating the departure time of the SYN-ACK frame.

In one example, when the timestamp information indicating the departure time of the SYN-ACK frame is obtained from the acknowledgment sequence number field of the header of the SYN-ACK frame, deriving the network performance metric further includes subtracting a value of 1 ("one") to account for incrementing of an acknowledgment sequence number by the network entity when generating and sending the SYN-ACK frame.

In one example, the timestamp information indicating the departure time of the first frame includes 32 bits, wherein 24 bits are allocated to represent nanoseconds and 8 bits are allocated to represent seconds.

In some aspects, the techniques described herein relate to an apparatus including: a network interface configured to enable communications over a network; and a processor coupled to the network interface, the processor configured to perform operations including: generating a first frame according to a feature of a networking protocol, the first frame including timestamp information indicating a departure time of the first frame into each of a first field and a second field of a header of the first frame; sending the first frame to a network entity in the network, the first frame configured to cause the network entity to send, in reply to the first frame, a second frame according to the feature of the networking protocol, the second frame including timestamp information indicating a departure time of the second frame in either a first field or a second field of a header of the second frame; receiving the second frame; and deriving a network performance metric from the timestamp information indicating a departure time of the first frame and the timestamp information included in the second frame.

In one example, the networking protocol is the Transmission Control Protocol (TCP) and the feature of the networking protocol is the TCP Half-Close feature, wherein the first frame is a TCP synchronize (SYN) frame, the first field is a sequence number field of a header of the TCP SYN frame and the second field is a timestamp value subfield of a TCP options field of the header of the TCP SYN frame.

In some aspects, the techniques described herein relate to one or more non-transitory computer readable storage media encoded with instructions that, when executed by a processor, cause the processor to perform operations including: generating a first frame according to a feature of a networking protocol, the first frame including timestamp information indicating a departure time of the first frame into each of a first field and a second field of a header of the first frame; sending the first frame to a network entity in the network, the first frame configured to cause the network entity to send, in reply to the first frame, a second frame according to the feature of the networking protocol, the second frame including timestamp information indicating a departure time of the second frame in either a first field or a second field of a header of the second frame; receiving the second frame; and deriving a network performance metric from the timestamp information indicating a departure time of the first frame and the timestamp information included in the second frame.

In some aspects, the techniques described herein relate to one or more non-transitory computer readable storage media, wherein the networking protocol is the Transmission Control Protocol (TCP) and the feature of the networking protocol is the TCP Half-Close feature, wherein the first frame is a TCP synchronize (SYN) frame, the first field is a sequence number field of a header of the TCP SYN frame and the second field is a timestamp value subfield of a TCP options field of the header of the TCP SYN frame.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

generating at a first device, a first frame according to a feature of a networking protocol, the generating including inserting a timestamp indicating a departure time of the first frame into each of a first field and a second field of a header of the first frame, wherein the first field of the header of the first frame is a sequence number field;

sending the first frame to a network entity in a network, the first frame configured to cause the network entity to send, in reply to the first frame, a second frame according to the feature of the networking protocol, the second frame including a timestamp indicating a departure time of the second frame in either a first field or a second field of a header of the second frame;

receiving the second frame at the first device; and deriving a network performance metric from the timestamp indicating a departure time of the first frame and the timestamp included in the second frame.

2. The method of claim 1, further comprising sending a third frame from the first device to the network entity, the third frame including a flag to indicate a closure of a session between the first device and the network entity.

3. The method of claim 2, wherein the networking protocol is the Transmission Control Protocol (TCP) and the feature of the networking protocol is the TCP Half-Close feature.

4. The method of claim 3, wherein the first frame is a TCP synchronize (SYN) frame and the second field of the header of the first frame is a timestamp value subfield of a TCP options field of the header of the TCP SYN frame.

5. The method of claim 4, wherein the second frame is a TCP synchronize-acknowledgment (SYN-ACK) frame, the first field of the header of the second frame is an acknowledgment sequence number field of a header of the TCP SYN-ACK frame and the second field of the header of the second frame is a timestamp echo reply subfield of a TCP options field of the header of the SYN-ACK frame.

6. The method of claim 5, further comprising:

decoding the SYN-ACK frame received from the network entity to determine whether the timestamp indicating the departure time of the second frame is included in the timestamp echo reply subfield, and if not, obtaining the timestamp indicating the departure time of the second frame from the acknowledgment sequence number field of the header of the SYN-ACK frame.

7. The method of claim 6, wherein deriving the network performance metric includes:

performing a subtraction of an arrival time of the SYN-ACK frame at the first device from the timestamp indicating the departure time of the SYN-ACK frame.

8. The method of claim 7, wherein when the timestamp indicating the departure time of the SYN-ACK frame is obtained from the acknowledgment sequence number field of the header of the SYN-ACK frame, deriving the network performance metric further includes subtracting a value of 1 ("one") to account for incrementing of an acknowledgment sequence number by the network entity when generating and sending the SYN-ACK frame.

9. The method of claim 1, wherein the first field of the header of the second frame or the second field of the header of the second frame is an acknowledgment sequence number field, wherein the timestamp indicating the departure time of the first frame comprises 32 bits, and wherein 24 bits are allocated to represent nanoseconds and 8 bits are allocated to represent seconds.

10. An apparatus comprising:

a network interface configured to enable communications over a network; and a processor coupled to the network interface, the processor configured to perform operations including:

generating a first frame according to a feature of a networking protocol, the first frame including a timestamp indicating a departure time of the first frame into each of a first field and a second field of a header of the first frame, wherein the first field of the header of the first frame is a sequence number field;

sending the first frame to a network entity in the network, the first frame configured to cause the network entity to send, in reply to the first frame, a second frame according to the feature of the networking protocol, the second frame including a timestamp indicating a departure time of the second frame in either a first field or a second field of a header of the second frame;

receiving the second frame; and deriving a network performance metric from the timestamp indicating a departure time of the first frame and the timestamp included in the second frame.

11. The apparatus of claim 10, wherein the networking protocol is the Transmission Control Protocol (TCP) and the feature of the networking protocol is the TCP Half-Close feature, wherein the first frame is a TCP synchronize (SYN) frame and the second field of the header of the first frame is a timestamp value subfield of a TCP options field of the header of the TCP SYN frame.

12. The apparatus of claim 11, wherein the second frame is a TCP synchronize-acknowledgment (SYN-ACK) frame, the first field of the header of the second frame is an acknowledgment sequence number field of a header of the TCP SYN-ACK frame and the second field of the header of the second frame is a timestamp echo reply subfield of a TCP options field of the header of the SYN-ACK frame.

13. The apparatus of claim 12, wherein the processor is further configured to perform decoding of the SYN-ACK frame received from the network entity to determine whether the timestamp indicating the departure time of the second frame is included in the timestamp echo reply subfield, and if not, obtaining the timestamp indicating the departure time of the second frame from the acknowledgment sequence number field of the header of the SYN-ACK frame.

14. The apparatus of claim 13, wherein the processor is configured to perform the deriving of the network performance metric by performing a subtraction of an arrival time of the SYN-ACK frame from the timestamp indicating the departure time of the SYN-ACK frame.

15. The apparatus of claim 14, wherein when the timestamp indicating the departure time of the SYN-ACK frame is obtained from the acknowledgment sequence number field of the header of the SYN-ACK frame, the processor is configured to perform the deriving of the network performance metric by subtracting a value of 1 ("one") to account for incrementing of an acknowledgment sequence number by the network entity when generating and sending the SYN-ACK frame.

16. One or more non-transitory computer readable storage media encoded with instructions that, when executed by a processor, cause the processor to perform operations including:

generating a first frame according to a feature of a networking protocol, the first frame including a timestamp indicating a departure time of the first frame into each of a first field and a second field of a header of the first frame, wherein the first field of the header of the first frame is a sequence number field;

sending the first frame to a network entity in a network, the first frame configured to cause the network entity to send, in reply to the first frame, a second frame according to the feature of the networking protocol, the second frame including a timestamp indicating a departure time of the second frame in either a first field or a second field of a header of the second frame;

receiving the second frame; and deriving a network performance metric from the timestamp indicating a departure time of the first frame and the timestamp included in the second frame.

17. The one or more non-transitory computer readable storage media of claim 16, wherein the networking protocol is the Transmission Control Protocol (TCP) and the feature of the networking protocol is the TCP Half-Close feature, wherein the first frame is a TCP synchronize (SYN) frame and the second field of the header of the first frame is a timestamp value subfield of a TCP options field of the header of the TCP SYN frame.

18. The one or more non-transitory computer readable storage media of claim 17, wherein the second frame is a TCP synchronize-acknowledgment (SYN-ACK) frame, the first field of the header of the second frame is an acknowledgment sequence number field of a header of the TCP SYN-ACK frame and the second field of the header of the second frame is a timestamp echo reply subfield of a TCP options field of the header of the SYN-ACK frame.

19. The one or more non-transitory computer readable storage media of claim 18, further including instructions that cause the processor to perform decoding of the SYN-ACK frame received from the network entity to determine whether the timestamp indicating the departure time of the second frame is included in the timestamp echo reply subfield, and if not, obtaining the timestamp indicating the departure time of the second frame from the acknowledgment sequence number field of the header of the SYN-ACK frame.

20. The one or more non-transitory computer readable storage media of claim 19, wherein the instructions that cause the processor to perform the deriving of the network performance metric include instructions for performing a subtraction of an arrival time of the SYN-ACK frame from the timestamp indicating the departure time of the SYN-ACK frame.

* * * * *